United States Patent
Lee et al.

(10) Patent No.: US 10,476,094 B2
(45) Date of Patent: Nov. 12, 2019

(54) REINFORCED MEMBRANE, ELECTROCHEMICAL CELL AND FUEL CELL COMPRISING SAME, AND PRODUCTION METHOD FOR REINFORCED MEMBRANE

(71) Applicant: LG CHEM, LTD., Seoul (KR)

(72) Inventors: Moonchan Lee, Daejeon (KR); Curie Park, Daejeon (KR); Hyuk Kim, Daejeon (KR); Insung Bae, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/777,997

(22) PCT Filed: Mar. 31, 2017

(86) PCT No.: PCT/KR2017/003553
§ 371 (c)(1),
(2) Date: May 22, 2018

(87) PCT Pub. No.: WO2017/171471
PCT Pub. Date: Oct. 5, 2017

(65) Prior Publication Data
US 2018/0351190 A1    Dec. 6, 2018

(30) Foreign Application Priority Data
Mar. 31, 2016  (KR) .................. 10-2016-0039723

(51) Int. Cl.
*H01M 8/02* (2016.01)
*H01M 8/1004* (2016.01)
(Continued)

(52) U.S. Cl.
CPC ....... *H01M 8/1004* (2013.01); *H01M 4/8807* (2013.01); *H01M 4/928* (2013.01);
(Continued)

(58) Field of Classification Search
CPC ..................................................... H01M 8/02
See application file for complete search history.

(56) References Cited

U.S. PATENT DOCUMENTS

2005/0287418 A1*  12/2005  Noh .................. B82Y 30/00
                                                                429/483
2006/0177720 A1    8/2006  Kim
2013/0052563 A1    2/2013  Sharman et al.

FOREIGN PATENT DOCUMENTS

JP          2007-48471 A      2/2007
KR   10-2001-0092913 A      10/2001
(Continued)

OTHER PUBLICATIONS

International Search Report for PCT/KR2017/003553 (PCT/ISA/210) dated Jul. 10, 2017.

*Primary Examiner* — Jacob B Marks
(74) *Attorney, Agent, or Firm* — Birch, Stewart, Kolasch & Birch, LLP

(57) ABSTRACT

The present specification relates to a reinforced membrane including a porous polymer support; platinum nanoparticles that are dispersed on both surfaces of the porous polymer support and the surface in the pores; and an ion conductive polymer provided in the pores of the porous polymer support, in which the average diameter of the platinum nanoparticles is 1 nm or more and 50 nm or less.

9 Claims, 12 Drawing Sheets

(51) Int. Cl.
*H01M 4/88* (2006.01)
*H01M 4/92* (2006.01)
*H01M 8/1044* (2016.01)
*H01M 4/86* (2006.01)
*H01M 8/1018* (2016.01)

(52) U.S. Cl.
CPC .. *H01M 8/1044* (2013.01); *H01M 2004/8684* (2013.01); *H01M 2004/8689* (2013.01); *H01M 2008/1095* (2013.01)

(56) References Cited

FOREIGN PATENT DOCUMENTS

| KR | 10-2012-0136442 A | 12/2012 |
| KR | 10-1464317-81 | 11/2014 |
| KR | 10-2015-0060435 A | 6/2015 |

* cited by examiner

[Figure 1]
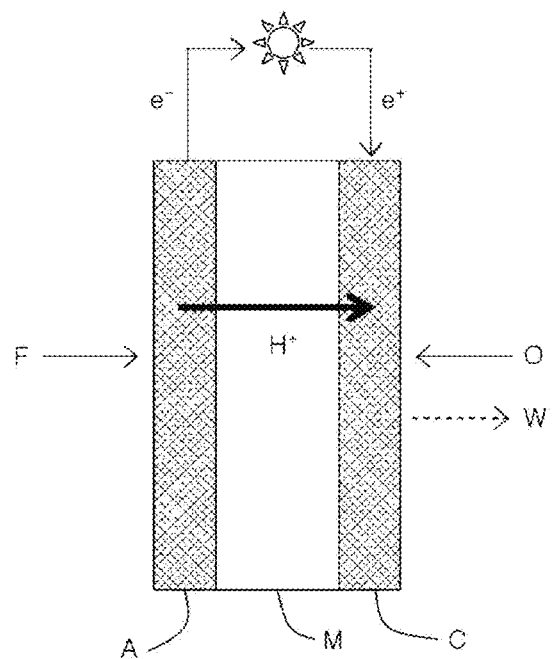
[Figure 2]
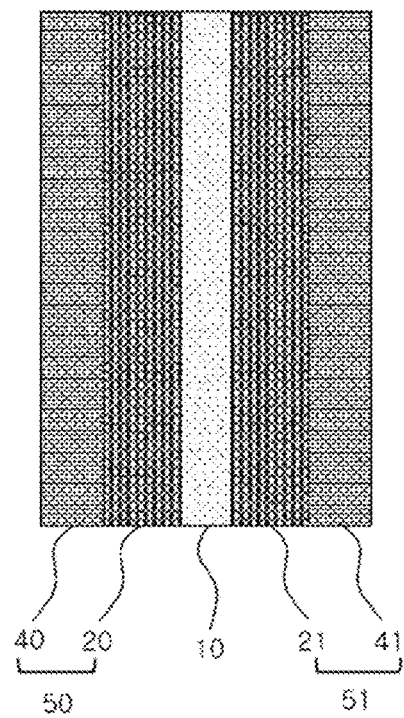

[Figure 3]
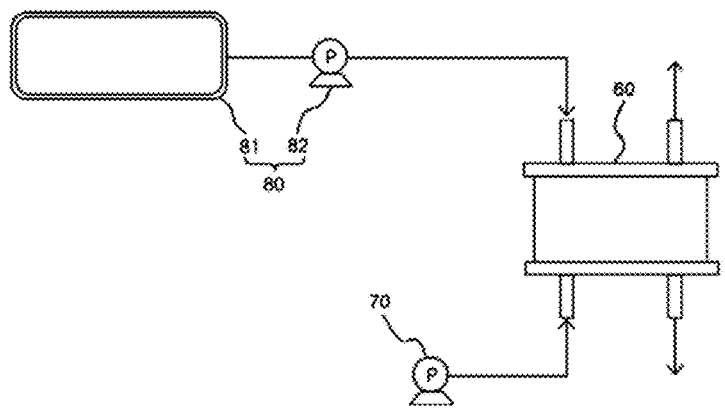
[Figure 4]
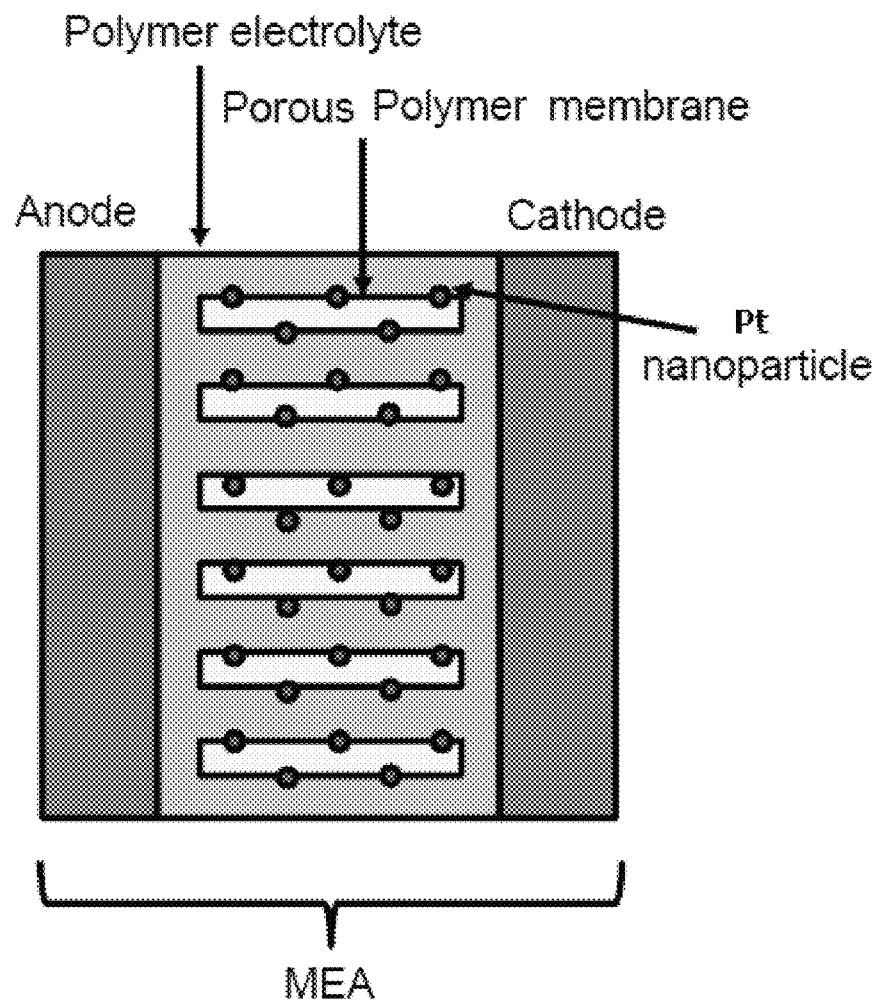

[Figure 5]
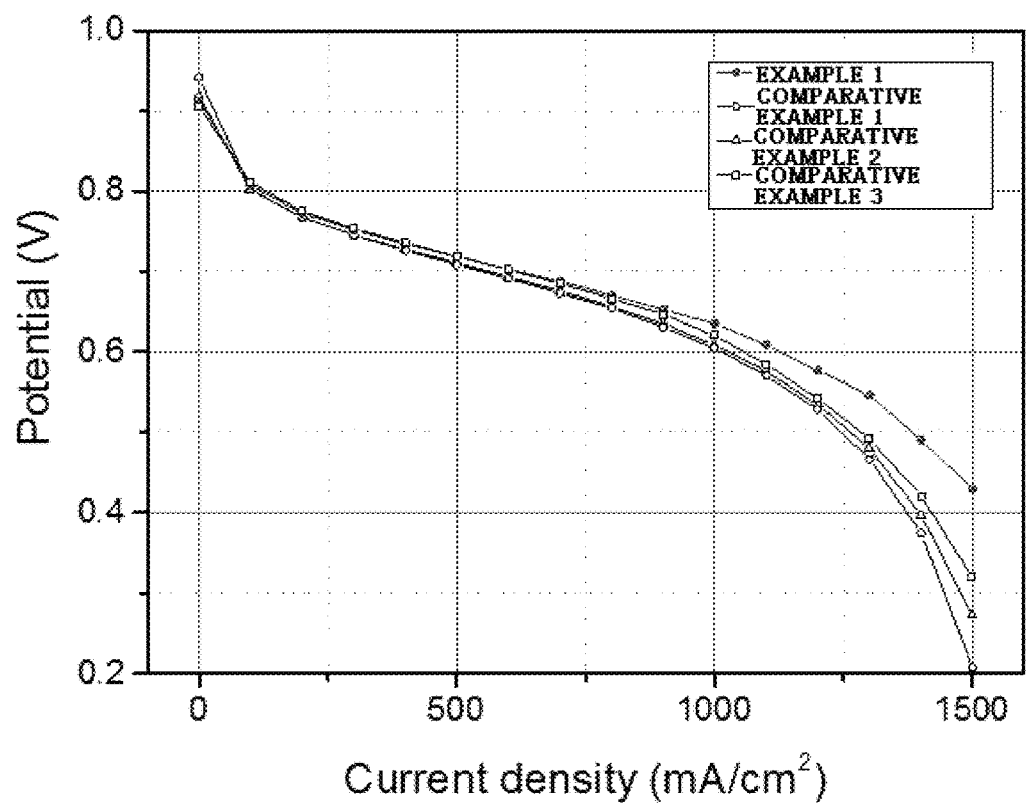

[Figure 6]
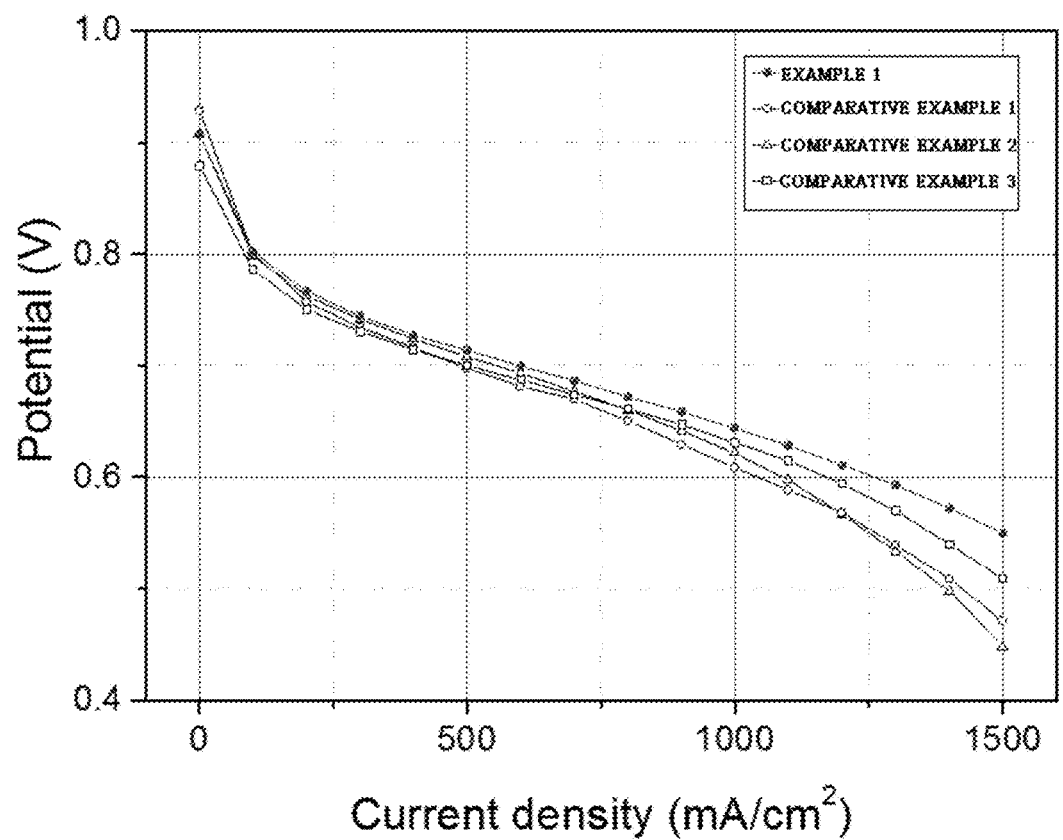

[Figure 7]
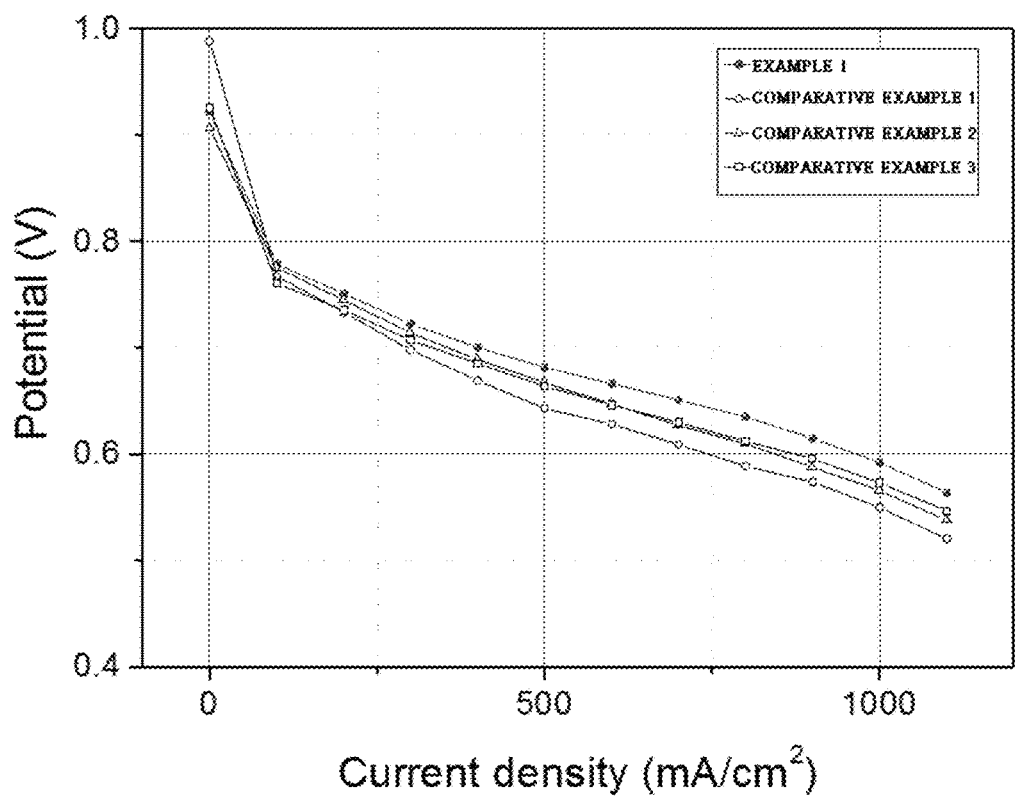

[Figure 8]
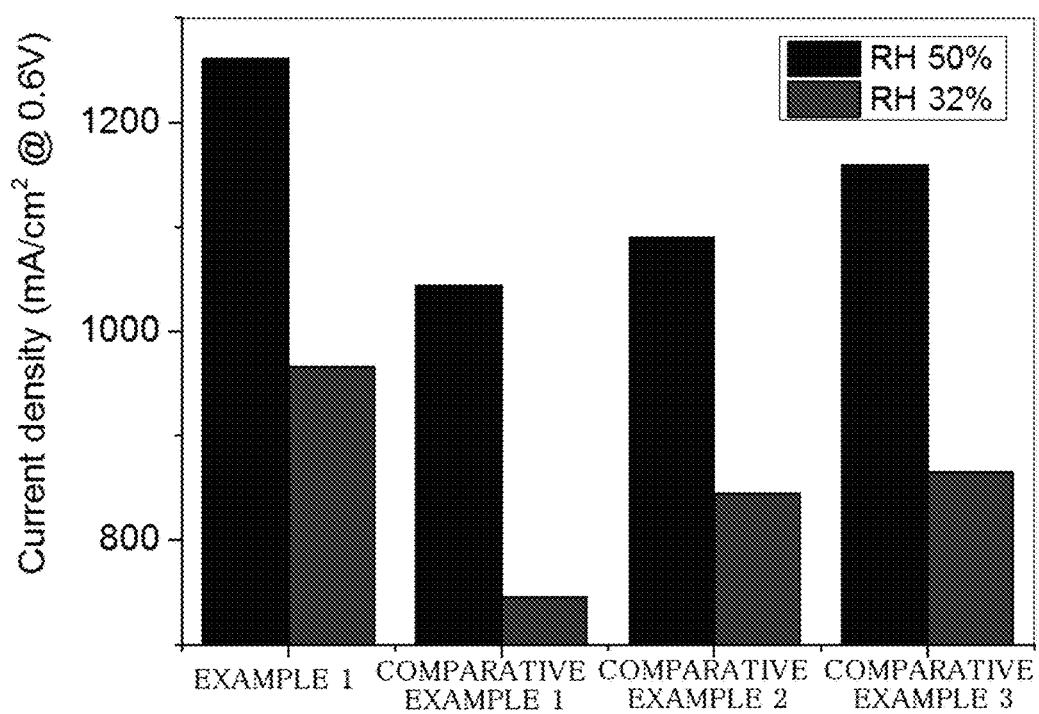

[Figure 9]
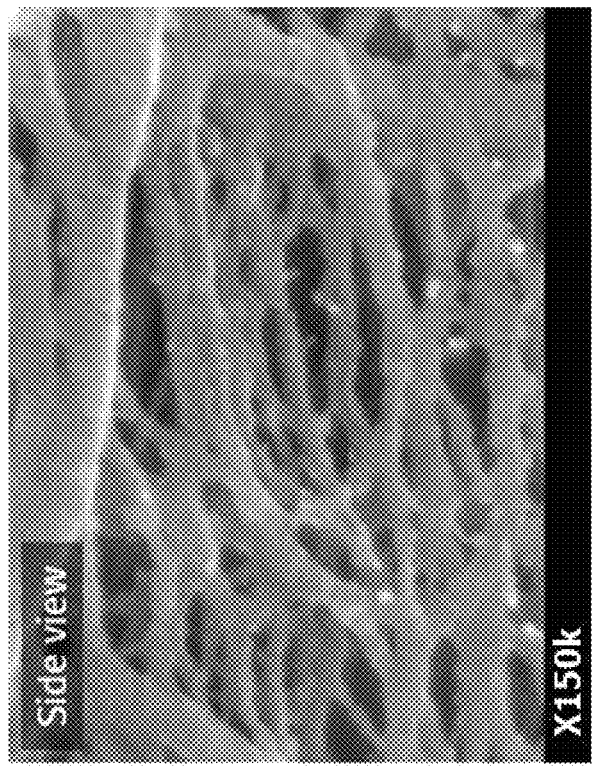
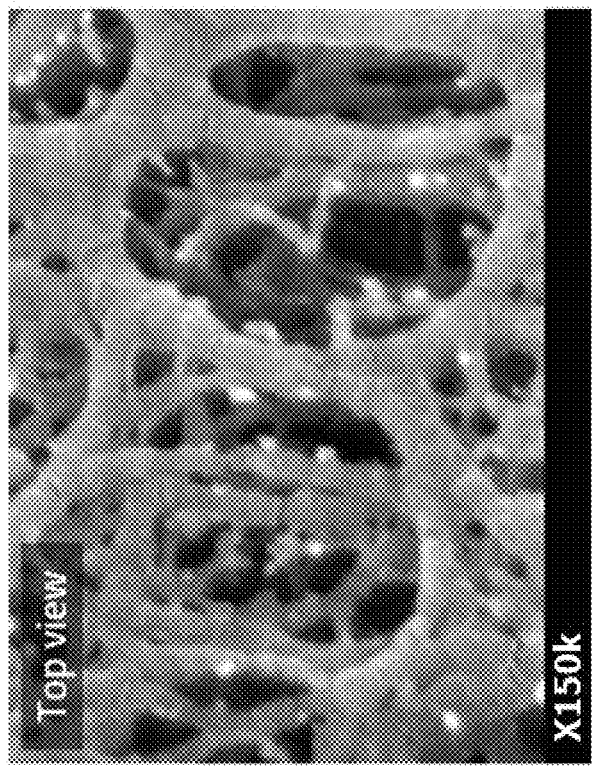

[Figure 10]
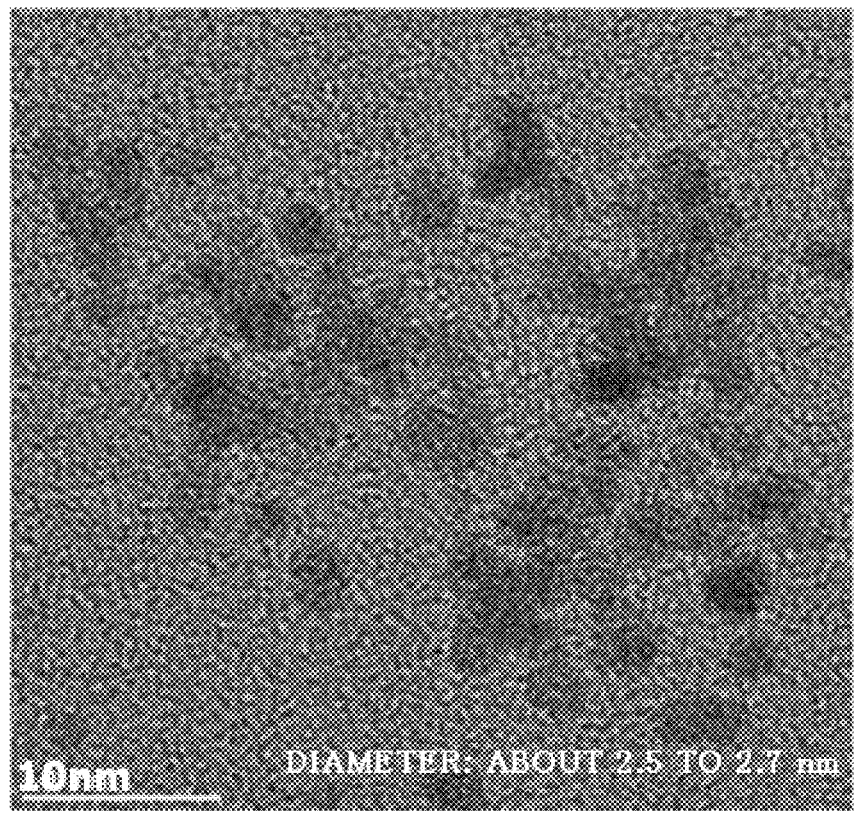

[Figure 11]

| | DI water CONTACT ANGLE (°) | Diiodomethane CONTACT ANGLE (°) | SURFACE ENERGY (mN/m) |
|---|---|---|---|
| EXAMPLE | 113.6 | 72.4 | 22.78 |
| COMPARATIVE EXAMPLE 1 | 123.1 | 96.2 | 10.28 |
| COMPARATIVE EXAMPLE 3 (PORTION WHERE PT NANOPARTICLES ARE NOT VISIBLE WITH NAKED EYES) | 125.4 | 88.3 | 14.92 |
| COMPARATIVE EXAMPLE 3 (PORTION WHERE PT NANOPARTICLES ARE AGGLOMERATED AND COATED WITH NAKED EYES) | 106.7 | 58.5 | 30.95 |

[Figure 12]
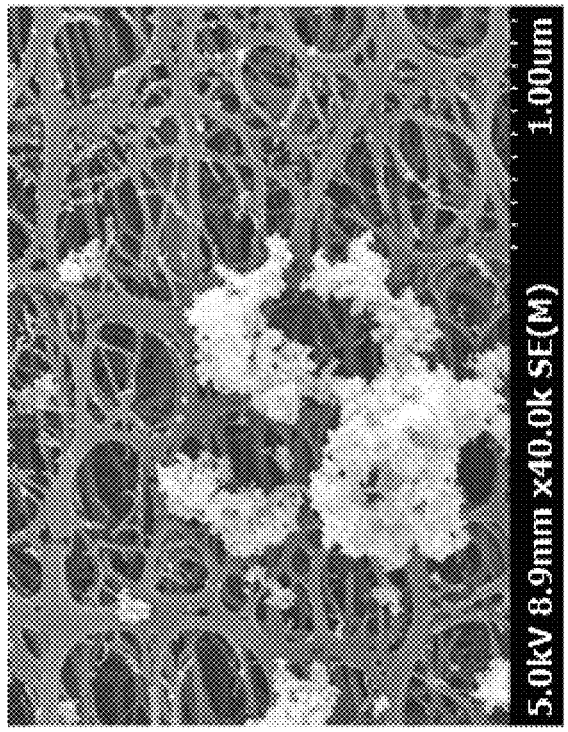
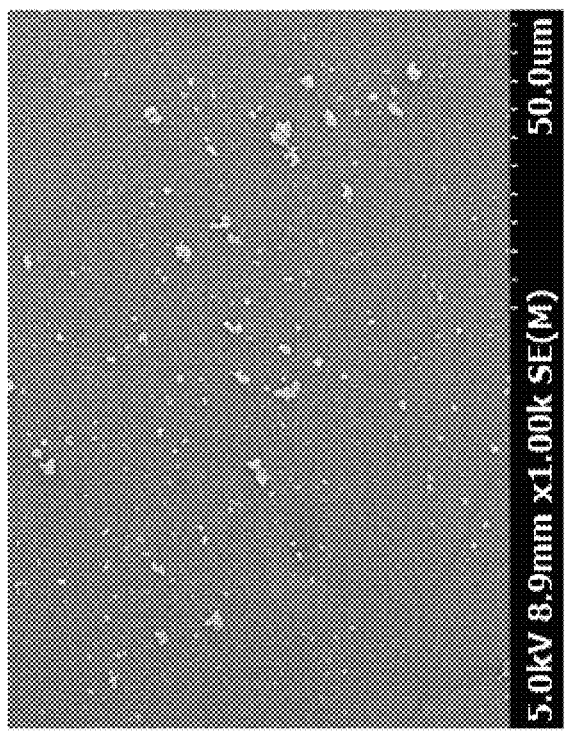

[Figure 13]
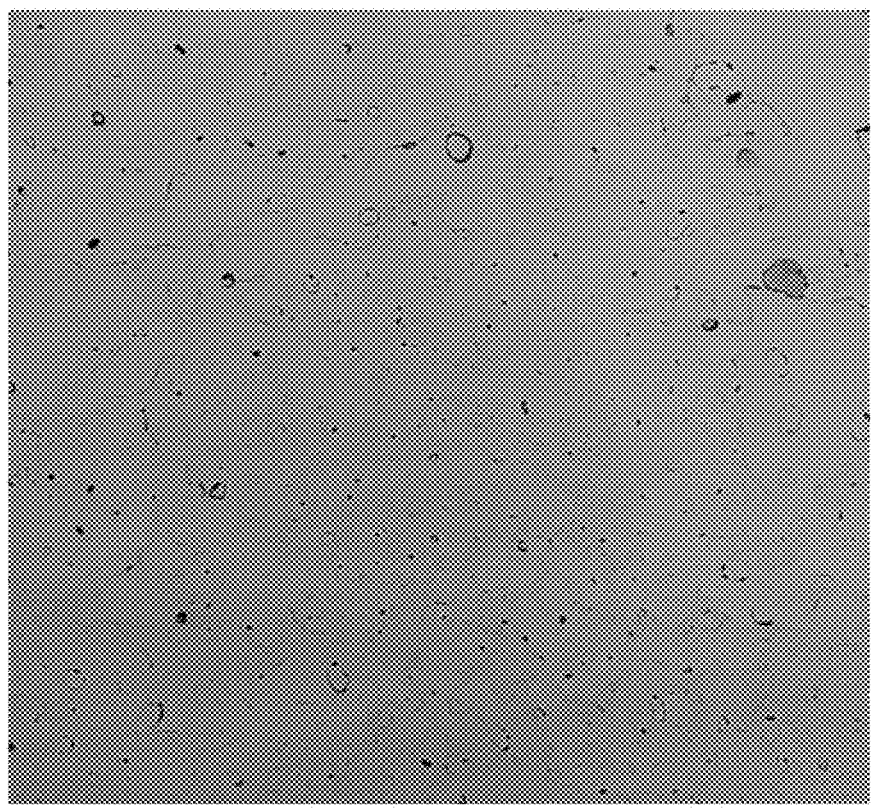

[Figure 14]
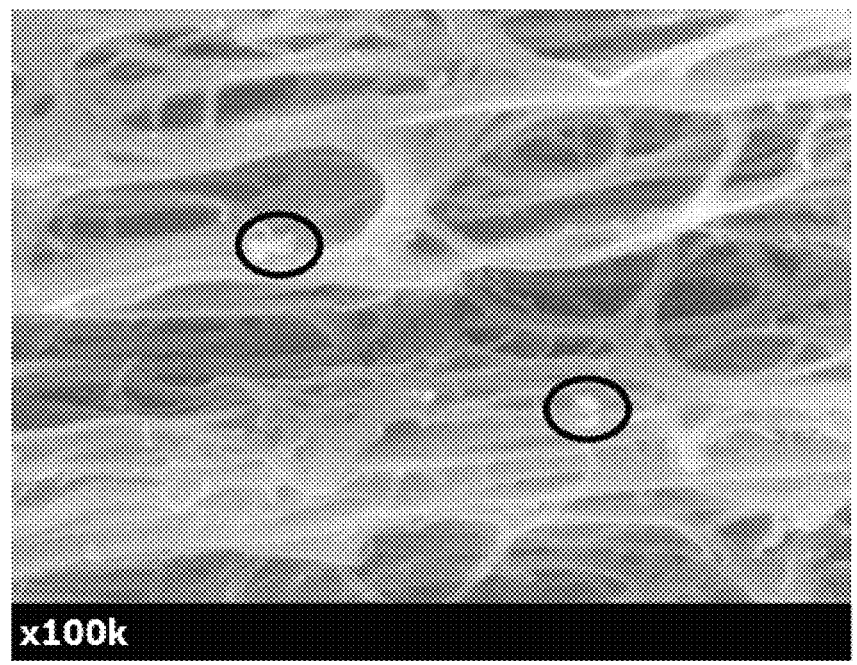

REINFORCED MEMBRANE, ELECTROCHEMICAL CELL AND FUEL CELL COMPRISING SAME, AND PRODUCTION METHOD FOR REINFORCED MEMBRANE

TECHNICAL FIELD

This application claims priority to and the benefit of Korean Patent Application No. 10-2016-0039723 filed in the Korean Intellectual Property Office on Mar. 31, 2016, the entire contents of which are incorporated herein by reference.

The present specification relates to a reinforced membrane, an electrochemical cell and a fuel cell including the same, and a method for preparing the reinforced membrane.

BACKGROUND ART

A reinforced membrane is used in fields requiring ion exchange capacity, such as cells, sensors, and the like, and particularly, the reinforced membrane has been used as an ion exchange membrane of a fuel cell, a chemical sensor, a flow battery, or the like.

Recently, as the depletion of existing energy resources such as oil and coal is predicted, the need for energy that may replace the energy resources has been increased, and there is a growing interest in fuel cells, metal secondary batteries, flow batteries, and the like as one of the alternative energies.

As one of the alternative energies, the fuel cell has high efficiency and does not discharge pollutants such as NOx and Sox and the used fuel is abundant, and thus the related researches have been actively conducted. In addition, the researches on the reinforced membrane provided as a polymer electrolyte membrane of the fuel cell are required.

The researches on the metal secondary battery for enhancing the efficiency of charging and discharging have been conducted, and particularly, the researches on a metal air secondary battery are being conducted by connecting an air electrode of the fuel cell. Accordingly, there is also growing interest in a reinforced membrane provided by an electrolyte membrane of the metal secondary battery.

The flow battery is a secondary battery in which charging and discharging are performed while the electrolyte in which the energy is stored is circulated, and the researches on the flow battery is being actively conducted in addition to the reinforced membrane provided by an electrolyte membrane of the flow.

DETAILED DESCRIPTION OF THE INVENTION

Technical Problem

The present specification has been made in an effort to provide a reinforced membrane, an electrochemical cell and a fuel cell including the same, and a method for preparing the reinforced membrane.

Technical Solution

An exemplary embodiment of the present specification provides a reinforced membrane including a porous polymer support; platinum nanoparticles that are dispersed on both surfaces of the porous polymer support and the surface in the pores of the porous polymer support; and an ion conductive polymer provided in the pores of the porous polymer support, in which the average diameter of the platinum nanoparticles is 1 nm or more and 50 nm or less.

Another exemplary embodiment of the present specification provides an electrochemical cell including an anode; a cathode; and a reinforced membrane provided between the anode and the cathode.

Still another exemplary embodiment of the present specification provides a membrane electrode assembly including an anode; a cathode; and a reinforced membrane provided between the anode and the cathode.

Yet another exemplary embodiment of the present specification provides a fuel cell including the membrane electrode assembly.

Still yet another exemplary embodiment of the present specification provides a method for preparing a reinforced membrane including: forming platinum nanoparticles that are dispersed on both surfaces of a porous polymer support and the surface in pores by impregnating the porous polymer support with a solution including a precursor of the platinum nanoparticles; and forming an ion conductive polymer in the pores of the porous polymer support with the platinum nanoparticles provided on the surface, in which the average diameter of the platinum nanoparticles is 1 nm or more and 50 nm or less.

Advantageous Effects

According to the reinforced membrane of the exemplary embodiment of the present specification, it is possible to reduce a phenomenon in which an impregnated ion conductive polymer impregnated solution is dewetted from a porous support.

In the reinforced membrane of the exemplary embodiment of the present specification, the ion conductive polymer may be evenly impregnated in the porous support.

The reinforced membrane of the exemplary embodiment of the present invention has a self-humidifying function that generates water using hydrogen and oxygen crossovering the reinforced membrane.

BRIEF DESCRIPTION OF DRAWINGS

FIG. 1 is a schematic diagram illustrating an electricity generation principle of a fuel cell.

FIG. 2 is a diagram schematically illustrating a structure of a membrane electrode assembly for a fuel cell.

FIG. 3 is a diagram schematically illustrating an example of a fuel cell.

FIG. 4 is a cross-sectional view of the membrane electrode assembly according to an exemplary embodiment of the present invention.

FIG. 5 illustrates voltages depending on current densities of membrane electrode assemblies according to Example and Comparative Example under a condition of relative humidity (RH) 100%.

FIG. 6 illustrates voltages depending on current densities of membrane electrode assemblies according to Example and Comparative Example under a condition of relative humidity (RH) 50%.

FIG. 7 illustrates voltages depending on current densities of membrane electrode assemblies according to Example and Comparative Example under a condition of relative humidity (RH) 32%.

FIG. 8 illustrates current density values at 0.6 V of membrane electrode assemblies according to Example and Comparative Example under a condition of relative humidity (RH) 50%/32%.

FIG. 9 is a scanning electron microphotograph obtained by measuring the surface and the cross section of the porous support in Example.

FIG. 10 is a transmission electron microphotograph obtained by measuring the shape of a platinum particle coated on the porous support in Example.

FIG. 11 illustrates a result obtained by calculating surface energies by measuring contact angles of water and diiodomethane droplets placed on the porous supports in Example and Comparative Example, respectively.

FIG. 12 is a scanning electron microphotograph obtained by measuring the surface of a porous support in Comparative Example 3.

FIG. 13 is an optical microphotograph obtained by measuring the surface of the porous support in Comparative Example 3.

FIG. 14 is a scanning electron microphotograph obtained by measuring the cross section of a porous support in Comparative Example 3.

EXPLANATION OF REFERENCE NUMERALS AND SYMBOLS

10: Electrolyte membrane
20, 21: Catalyst layer
40, 41: Gas diffusion layer
50: Cathode
51: Anode
60: Stack
70: Oxidant supply unit
80: Fuel supply unit
81: Fuel tank
82: Pump

[Best Mode]

Hereinafter, the present specification will be described in detail.

The present specification provides a reinforced membrane including a porous polymer support; a platinum layer provided on the surface of the porous polymer support; and an ion conductive polymer provided in a pore of the porous polymer support.

The present specification provides a reinforced membrane including a porous polymer support; platinum nanoparticles dispersed on both surfaces of the porous polymer support and the surface in a pore of the porous polymer support; and an ion conductive polymer provided in the pores of the porous polymer support, in which an average diameter of the platinum nanoparticles is 1 nm or more and 50 nm or less.

If the porous polymer support has a plurality of pores, the structure and the material of the porous support are not particularly limited and may be generally used in the art. For example, the porous polymer support may include at least one of polyimide (PI), nylon, polyethyleneterephtalate (PET), polytetrafluoro ethylene (PTFE), polyethylene (PE), polypropylene (PP), poly(arylene ether sulfone) (PASS) and polyetheretherketone (PEEK). The porous polymer support may include a polyolefin-based polymer and particularly, the porous polymer support may include a polyolefin-based polymer including at least one of polyethylene, polypropylene, and polyisobutylene.

An individual diameter of the pores of the porous polymer support may be 1 nm or more and 50 µm or less. Particularly, the individual diameter of the pores of the porous polymer support may be 10 nm or more and 1 µm or less and preferably, the individual diameter of the pores of the porous polymer support may be 50 nm or more and 500 nm or less. As the number of dense pores is more than that of pores having large diameters, there is an advantage that permeability and durability are increased.

The method of measuring the individual diameter of the pores of the porous polymer support is not particularly limited, and methods used in the art may be adopted, but for example, a diameter of the pores may be measured by an electron microscope.

The porosity of the porous polymer support may be 50% or more and 95% or less. In this case, there is an advantage in that when the ion conductive polymer is impregnated into the pores of the porous polymer support, an ion channel is formed well.

The thickness of the porous polymer support is particularly limited, but may be 1 µm or more and 20 µm or less.

The platinum layer may include platinum nanoparticles provided on both surfaces of the porous polymer support and the surface in the pore. A self-humidity function of the electrolyte membrane may be introduced through the platinum nanoparticles which are evenly dispersed in the reinforced membrane. Particularly, hydrogen and oxygen crossovering the reinforced membrane may be generated into water by acting the platinum particles in the reinforced membrane as a catalyst. Further, the platinum layer may increase the impregnation degree of the ion conductive polymer to a reinforced substrate by improving surface energy of the reinforced substrate.

The average diameter of the platinum nanoparticles may be 1 nm or more and 50 nm or less. In this case, the average diameter may have a size having maximum catalytic activity while the resistance to ion transfer in the reinforced membrane is minimized.

The average diameter of the platinum nanoparticles may be 1 nm or more and 30 nm or less, more specifically, 1 nm or more and 10 nm or less.

The individual diameter of the platinum nanoparticles may be more than 0 nm and 100 nm or less, particularly more than 0 nm and 50 nm or less, and more particularly, more than 0 nm and 30 nm or less.

Herein, the diameter means the longest distance of distances from one point to another point on the surface of the platinum nanoparticles in an image measured through the electron microscope.

The ion conductive polymer may be provided in the pores of the porous polymer support. Particularly, the ion conductive polymer may be provided in the pores of the porous polymer support provided with the platinum layer.

When the platinum layer includes platinum nanoparticles dispersed on both surface of the porous polymer support and in the pore, the ion conductive polymer may be provided on the surface of the platinum nanoparticles provided in the pores of the porous polymer support and between the platinum nanoparticles, that is, in the pores of the porous polymer support without the platinum nanoparticles.

Since the porous polymer support has minute pores, the surface energy of the surface of the porous polymer support is higher than that of the support without pores made of the same material, and thus, dewetting in which the ion conductive polymer is not evenly penetrated into the pores of the porous polymer support or emitted to the surface of the porous polymer support by repulsive force may occur.

The porous polymer support provided with the platinum layer of the present invention has a high affinity with the ion conductive polymer, so that the ion conductive polymer may be uniformly impregnated in the pores of the porous polymer support.

The ion conductive polymer is not particularly limited as long as it is a substance capable of ion exchange, and ion conductive polymers generally used in the art may be used.

The ion conductive polymer may be a hydrocarbon-based polymer, a partially fluorinated polymer, or a fluorinated polymer.

The hydrocarbon-based polymer may be a hydrocarbon-based sulfonated polymer without a fluorine group, and on the other hand, the fluorinated polymer may be a sulfonated polymer saturated with a fluorine group, and the partial fluorinated polymer may be a sulfonated polymer which is not saturated with a fluorine group.

The ion conductive polymer may be one or more selected from the group consisting of a perfluorosulfonic acid-based polymer, a hydrocarbon-based polymer, an aromatic sulfone-based polymer, an aromatic ketone-based polymer, a polybenzimidazole-based polymer, a polystyrene-based polymer, a polyester-based polymer, a polyimide-based polymer, a polyvinylidene fluoride-based polymer, a polyether sulfone-based polymer, a polyphenylene sulfide-based polymer, a polyphenylene oxide-based polymer, a polyphosphazene-based polymer, a polyethylene naphthalate-based polymer, a polyester-based polymer, a doped polybenzimidazole-based polymer, a polyether ketone-based polymer, a polyetheretherketone-based polymer, a polyphenylquinoxaline-based polymer, a polysulfone-based polymer, a polypyrrole-based polymer and a polyaniline-based polymer. The polymer may be used by sulfonating and may be a single copolymer, an alternating copolymer, a random copolymer, a block copolymer, a multi-block copolymer or a graft copolymer, but is not limited thereto.

The ion conductive polymer may be a polymer having cationic conductivity, and for example, may include at least one of a perfluorosulfonic acid-based polymer, sulfonated polyetheretherketone (sPEEK), sulfonated (polyetherketone) (sPEK), poly (vinylidene fluoride)-graft-poly(styrene sulfonic acid) (PVDF-g-PSSA), and sulfonated poly (fluorenyl ether ketone).

The content of the porous polymer support may be 5 wt % or more and 50 wt % or less based on the total weight of the reinforced membrane.

The content of the platinum layer may be 0.1 wt % or more and 10 wt % or less based on the total weight of the reinforced membrane. In this case, the platinum layer may have a maximum self-humidity and dewetting inhibition ability while minimizing the resistance to ion transport in the reinforced membrane is minimized.

Based on the total weight of the reinforced membrane, the content of the ion conductive polymer may be 45 wt % or more and 90 wt % or less, particularly 45 wt % or more and 90 wt % or less, and preferably 50 wt % or more and 90 wt % or less.

The present specification provides an electrochemical cell including an anode; a cathode; and a reinforced membrane provided between the anode and the cathode.

The cathode refers to an electrode that receives electrons when discharged to be reduced, and may be an anode (oxidation electrode) that is oxidized when charged to emit electrons. The anode refers to an electrode that is oxidized when discharged to emit electrons, and may be a cathode (reduction electrode) that receives electrons when charged to be reduced.

The electrochemical cell means a cell using a chemical reaction, and if the polymer electrolyte membrane is provided, the type is not particularly limited, but for example, the electrochemical cell may be a fuel cell, a metal secondary battery, or a flow battery.

The present specification provides an electrochemical cell module including an electrochemical cell as a unit cell.

The electrochemical cell module may be formed by inserting and stacking a bipolar plate between the unit cells according to one exemplary embodiment of the present application.

The cell module may be particularly used as power of an electric vehicle, a hybrid electric vehicle, a plug-in hybrid electric vehicle or an electric power storage device.

The present specification provides a membrane electrode assembly including an anode; a cathode; and a reinforced membrane provided between the anode and the cathode.

The present specification provides a fuel cell including the membrane electrode assembly.

FIG. 1 is a diagram schematically illustrating an electricity generation principle of a fuel cell. In the fuel cell, the most basic unit that generates electricity is a membrane electrode assembly (MEA) and the MEA is configured by an electrolyte membrane M and an anode A and a cathode C formed on both surfaces of the electrolyte membrane M. Referring to FIG. 1 illustrating the electricity generation principle of the fuel cell, in the anode A, an oxidation reaction of a fuel F of hydrogen or hydrocarbon such as methanol and butane occurs and then hydrogen ions ($H^+$) and electrons ($e^-$) are generated and the hydrogen ions move to the cathode C through the electrolyte membrane M. In the cathode C, the hydrogen ions transferred through the electrolyte membrane M react with an oxidant O such as oxygen and electrons to generate water W. This reaction causes electron transfer to an external circuit.

FIG. 2 schematically illustrates a structure of a membrane electrode assembly for a fuel cell. The membrane electrode assembly for the fuel cell may include an electrolyte membrane 10 and a cathode 50 and an anode 51 positioned to face each other with the electrolyte membrane 10 interposed therebetween. The cathode includes a cathode catalyst layer 20 and a cathode gas diffusion layer 40 sequentially from the electrolyte membrane 10, and the anode may include an anode catalyst layer 21 and an anode gas diffusion layer 41 sequentially from the electrolyte membrane 10.

FIG. 3 schematically illustrates the structure of the fuel cell. The fuel cell includes a stack 60, an oxidant supply unit 70, and a fuel supply unit 80.

The stack 60 includes one or more membrane electrode assemblies described above, and when two or more membrane electrode assemblies are included, separators interposed between the membrane electrode assemblies are included. The separators serve to prevent the membrane electrode assemblies from being electrically connected to each other and transfer the fuel supplied from the outside and the oxidant to the membrane electrode assemblies.

The oxidant supply unit 70 serves to supply the oxidant to the stack 60. As the oxidant, oxygen is representatively used, and oxygen or air which is injected into the oxidant supply unit 70 may be used.

The fuel supply unit 80 serves to supply the fuel to the stack 60 and includes a fuel tank 81 for storing the fuel and a pump 82 for supplying the fuel stored in the fuel tank 81 to the stack 60. As the fuel, gas or liquid hydrogen or hydrocarbon fuel may be used. Examples of the hydrocarbon fuel may include methanol, ethanol, propanol, butanol or natural gas.

The present specification provides a method for preparing a reinforced membrane including forming a platinum layer on the surface of a porous polymer support; and forming an ion conductive polymer in the pores of the porous polymer support with the platinum layer provided on the surface.

The method for preparing the reinforced membrane may cite those described in the reinforced membrane.

The method for preparing the reinforced membrane may include forming the platinum layer on the surface of the porous polymer support.

The forming of the platinum layer may include impregnating the porous polymer support with a first solution including a precursor of platinum nanoparticles. The platinum nanoparticles refer to nanoparticles containing platinum elements and the precursor of platinum nanoparticles may include at least one of precursors including platinum elements. Herein, the precursor means a material before becoming a specific material in a chemical reaction and particularly means a material in a previous step of platinum metal.

The first solution may further include at least one of a solvent, a dispersant, and a reducing agent.

The content of the precursor of the platinum nanoparticles may be 0.01 wt % or more and 10 wt % or less based on the weight of the porous polymer support and particularly, may be 0.01 wt % or more and 5 wt % or less based on the weight of the porous polymer support.

The content of the precursor of the platinum nanoparticles may be 0.01 wt % or more and 10 wt % or less based on the total weight of the first solution.

The content of the solvent may be 80 wt % or more and 90 wt % or less based on the total weight of the first solution.

The content of the dispersant may be 0.01 wt % or more and 10 wt % or less based on the total weight of the first solution.

The forming of the platinum layer may further include heating the first solution, and at this time, a final temperature may be 30° C. or more and 100° C. or less.

The forming of the platinum layer may include preparing the porous polymer support; impregnating the porous polymer support with the first solution including the precursor of the platinum nanoparticles; reducing the precursor of the platinum nanoparticles; and drying the porous polymer support.

The preparing of the porous polymer support may be preparing the porous polymer support to be prepared or the prepared porous polymer support to be purchased.

The method may further include pretreating the inner surface of the porous polymer support before impregnating the porous polymer support with the first solution.

The pretreating of the porous polymer support may include impregnating the porous polymer support with a pretreated solvent.

The pretreated solvent is not particularly limited, but may include at least one of alcohol-based solvents such as methanol and ethanol, and polyol-based solvents such as ethylene glycol.

In the reducing of the precursor of the platinum nanoparticles, the precursor of the platinum nanoparticles may be reduced to platinum nanoparticles by adding a reducing agent. At this time, the reducing agent to be used is not particularly limited, but for example, may be one or two or more selected from the group consisting of $NaBH_4$, $NH_2NH_2$, $LiAlH_4$ and $LiBEt_3H$.

The method for preparing the reinforced membrane may include forming an ion conductive polymer in the pores of the porous polymer support with the platinum layer provided on the surface.

The forming of the ion conductive polymer may include impregnating the porous polymer support with the platinum layer provided on the surface with the second solution including the ion conductive polymer.

The method for impregnating the porous polymer support with the solution is not particularly limited, and after the porous polymer support is added to a bath containing the solution or the solution is coated on one surface or two surfaces of the porous polymer support, the solution may be pressed to penetrate into the pores of the porous polymer support.

The second solution may further include a solvent.

The content of the ion conductive polymer may be 1 wt % or more and 20 wt % or less based on the total weight of the second solution.

The content of the solvent may be 80 wt % or more and 99 wt % or less based on the total weight of the second solution.

The viscosity of the second solution may be controlled depending on a kind of ion conductive polymer, a molecular weight, a concentration, and a type of solvent, and for example, may be 10 cP or more and 500 cP or less. In this case, the maximum ion conductivity may be obtained while maintaining a predetermined crossover rate or more with respect to the fuel and the like.

Hereinafter, the present specification will be described in more detail through Examples. However, the following Examples are just to exemplify the present specification and the present specification is not limited thereto.

EXAMPLES

Example 1

1) Preparation of Hydrocarbon-based Polymer 0.9 eq. of hydroquinonesulfonic acid potassium salt, 0.97 eq. of 4,4'-difluorobenzophenone, and 0.02 eq. of 3,5-bis(4-fluorobenzoyl)phenyl(4-fluorophenyl) methanone were added in a 1L round bottom flask equipped with a Dean-Stark trap and a condenser and prepared in a nitrogen atmosphere using potassium carbonate ($K_2CO_3$) as a catalyst in a dimethyl sulfoxide (DMSO) and benzene solvent. Thereafter, the reaction mixture was stirred in an oil bath at a temperature of 140° C. for 4 hours, an azeotropic mixture was adsorbed and removed in molecular sieves of the Dean-Stark trap while the benzene refluxed, and then the reaction temperature was raised to 180° C. and condensation polymerization was performed for 20 hours. After the reaction was completed, the temperature of the reaction product was reduced to 60° C., and then 0.2275 eq. of 4,4'-difluorobenzophenone, 0.335 eq. of 9,9-bis(hydroxyphenyl)fluorine, and 0.005 eq. of 3,5-bis(4-fluorobenzoyl)phenyl(4-fluorophenyl)-methanone) were added in the same flask and the reaction was initiated again by using $K_2CO_3$ as a catalyst in a nitrogen atmosphere using DMSO and benzene.

Thereafter, the reaction mixture was stirred in an oil bath at a temperature of 140° C. for 4 hours, an azeotropic mixture was adsorbed and removed in molecular sieves of the Dean-Stark trap while the benzene refluxed, and then the reaction temperature was raised to 180° C. and condensation polymerization was performed for 20 hours. Thereafter, the temperature of the reaction mixture was reduced to room temperature, DMSO was further added to dilute the product, and then the diluted product was poured into an excessive amount of methanol to separate a copolymer from the solvent. Thereafter, the copolymer obtained by removing and then filtering an excessive amount of potassium carbonate using water was dried in a vacuum oven at 80° C. for 12 hours or more to prepare a branched sulfonated multiblock copolymer (hereinafter, referred to as a hydrocarbon-based polymer) in which hydrophobic blocks and hydrophilic blocks are alternately chemically bonded to each other.

2) Platinum Particle Treatment on Porous Support

The platinum particles were prepared through a reduction reaction of a platinum precursor ($H_2PtCl_6$) and a coating method for the porous support is as follows. The platinum precursor (1 wt % based on the porous support) and a dispersant (with the same molar weight as the platinum precursor) were dissolved in a binary solvent consisting of ethanol and water, heated at 40° C. and stirred to prepare a platinum precursor solution. A polypropylene support having a three-dimensional network structure with a thickness of about 7 μm and a porosity of about 75% was pretreated with ethanol, and then immersed in the platinum precursor solution. Finally, the platinum precursor was reduced to platinum metal particles by adding a reducing agent ($NaBH_4$). During the reduction process, the color of the solution was changed to black, and as a result, it can be seen that the platinum precursor is reduced to particles. After the reaction was subjected for a sufficient time of 6 hours or more, the porous support coated with the platinum particles was washed with distilled water, and then dried at a high temperature and stored.

3) Preparation of Reinforced Membrane

The hydrocarbon-based polymer synthesized in 1) above was dissolved in a dimethylsulfoxide (DMSO) solvent to prepare a conductive polymer composition. A polymer solution was impregnated and coated on both surfaces of the support coated with the platinum particles and dried in an oven at 80° C. for 24 hours to prepare a hydrocarbon-based reinforced membrane. The prepared reinforced membrane was acid-treated with 10% sulfuric acid at 80° C. for 24 hours, washed with distilled water four times or more, and dried at 80° C. to prepare the reinforced membrane.

Comparative Example 1

A reinforced membrane was prepared in the same manner as in Example 1, except that a porous support was not coated with platinum particles.

Comparative Example 2

The platinum particles and a dispersant were further added to the conductive polymer composition of Example 1 to prepare an impregnation solution without 2) the pretreating of the porous support with the platinum particles, and a reinforced membrane was prepared in the same manner as in Example.

Comparative Example 3

A solution was prepared by dispersing Pt nanoparticles (average particle size of 7 nm, manufacturer of Alfa Aesar) in a heterogeneous solvent of water and ethanol (50:50 volume ratio) and spray-coated on the porous support. At this time, the weight of the coated Pt nanoparticles was 1 wt % based on the porous support.

Experimental Example 1

In order to measure the performance of the reinforced membrane prepared according to Examples and Comparative Examples in the fuel cell, a membrane electrode assembly including the reinforced membrane was prepared. Particularly, the reinforced membrane was cut into a square having a size of 7 cm×7 cm, and a carbon-supported platinum catalyst having a platinum content of 0.4 mg/cm$^2$ was transferred to the upper and lower surfaces of the polymer electrolyte membrane to a size of 5 cm×5 cm to prepare a membrane electrode assembly.

The performance of the prepared membrane electrode assembly was evaluated under conditions of relative humidity (RH) 100%, 50% and 32% under $H_2$/Air and normal pressure conditions, respectively.

FIG. 5 illustrates voltages depending on current densities of membrane electrode assemblies according to Example and Comparative Example under a condition of relative humidity (RH) 100%.

FIG. 6 illustrates voltages depending on current densities of fuel cells of the reinforced membranes according to Example and Comparative Example under a condition of relative humidity (RH) 50%.

FIG. 7 illustrates voltages depending on current densities of membrane electrode assemblies according to Example and Comparative Example under a condition of relative humidity (RH) 32%.

FIG. 8 illustrates current density values at 0.6 V of membrane electrode assemblies according to Example and Comparative Example under a condition of relative humidity (RH) 50% and 32%.

As seen from the results of FIGS. 5 to 8, like the reinforced membrane according to Example, when the platinum particles are coated on the porous support and dispersed evenly, the reinforced membrane may be more stable and maintain excellent performance under a low humidification condition.

Experimental Example 2

The sizes, shapes, and dispersion of the platinum particles coated on the porous support according to Example 1 were measured by using a scanning electron microscopy (SEM) and a transmission electron microscopy (TEM), and the results are illustrated in FIGS. 9 and 10.

In addition, the surface and the cross section of the porous support surface-treated with the platinum particles according to Comparative Example 3 were measured by a scanning electron microscopy (SEM) and an optical microscope, and the results are illustrated in FIGS. 12 to 14.

In FIG. 12, it can be seen that the platinum particles are agglomerated on the surface, and in FIG. 13, it can be seen that the platinum particles are agglomerated along dried stains of the sprayed solvent.

FIG. 14 illustrates a cross section of the porous support according to Comparative Example 3, and the platinum particles were hardly found in the interior, that is, in the pores of the porous support, and even though being observed, it was confirmed that platinum particles were agglomerated in a cluster form like the marked portion.

Experimental Example 3

The surface energy was calculated by measuring a contact angle between water and diiodomethane droplets placed on the porous support according to Examples and Comparative Examples by using a contact angle measuring device, and the results are illustrated in FIG. 11.

As seen from the results of FIG. 11, when the platinum particles are coated in the porous support like the porous support according to Examples, surface energy is increased, thereby suppressing the dewetting phenomenon that may occur upon impregnation of the ion conductive polymer.

Further, in Comparative Example 3, there is almost no change in surface energy at the portion where the platinum particles are hardly visible like Comparative Example 1, but the surface energy at the portion where the platinum particles are agglomerated and coated is increased like Examples. However, such a nonuniform coating may increase the resistance of the fuel cell.

Experimental Example 4

The surfaces and sides of the porous supports prepared in Examples 1 and 2 and Comparative Examples 1 and 2 were selected at random positions, the SEM was measured at five portions with 50000× magnification, and as a result, the number and sizes of platinum nanoparticles illustrated in the SEM were measured and averaged.

TABLE 1

|  | Individual diameter range (nm) | Average diameter (nm) |
|---|---|---|
| Example 1 | 4 to 37 | 16 |
| Comparative Example 1 | No platinum particle | No platinum particle |
| Comparative Example 2 | Difficult to confirm after polymer impregnation | Difficult to confirm after polymer impregnation |
| Comparative Example 3 | 10 to 1200 | 360 |

Comparative Example 1 is the reinforced membrane without platinum particles, and in Comparative Example 2, since the platinum nanoparticles were dispersed in the conductive polymer and then coated on the support, it was difficult to accurately confirm the platinum nanoparticles coated on the support by the SEM.

The invention claimed is:

1. A reinforced membrane comprising:
   a porous polymer support;
   platinum nanoparticles that are dispersed on both surfaces of the porous polymer support and the surface in the pores of the porous polymer support; and
   an ion conductive polymer provided in the pores of the porous polymer support,
   wherein the average diameter of the platinum nanoparticles is 1 nm or more and 50 nm or less.

2. The reinforced membrane of claim 1, wherein the porous polymer support includes a polyolefin-based polymer.

3. The reinforced membrane of claim 1, wherein the porosity of the porous polymer support is 50% or more and 95% or less.

4. The reinforced membrane of claim 1, wherein the content of the platinum nanoparticles is 0.1 wt % or more and 10 wt % or less based on the total weight of the reinforced membrane.

5. An electrochemical cell comprising:
   an anode; and
   a cathode: and
   the reinforced membrane of claim 1 provided between the anode and the cathode.

6. A membrane electrode assembly comprising:
   an anode;
   a cathode: and
   the reinforced membrane of claim 1 provided between the anode and the cathode.

7. A fuel cell comprising the membrane electrode assembly of claim 6.

8. A method for preparing a reinforced membrane comprising:
   forming platinum nanoparticles that are dispersed on both surfaces of a porous polymer support and the surface in pores of the porous polymer support by impregnating the porous polymer support with a solution including a precursor of the platinum nanoparticles; and
   forming an ion conductive polymer in the pores of the porous polymer support with the platinum nanoparticles provided on the surface,
   wherein the average diameter of the platinum nanoparticles is 1 nm or more and 50 nm or less.

9. The method of claim 8, wherein the forming of the ion conductive polymer includes impregnating the porous polymer support in which the platinum nanoparticles are dispersed on both surfaces and the surface in the pores with the solution including the ion conductive polymer.

* * * * *